United States Patent
Maallem et al.

(10) Patent No.: US 11,876,619 B2
(45) Date of Patent: *Jan. 16, 2024

(54) RELIABLE LINK QUALITY ESTIMATION IN MULTI-RATE NETWORKS

(71) Applicant: Itron Global SARL, Liberty Lake, WA (US)

(72) Inventors: Khalid Maallem, Issy les Moulineaux (FR); Jerome Bartier, Edinburgh (GB); Aziza Ben-Mosbah, Meudon (FR); Yacine Khaled, Meudon (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,289

(22) Filed: Feb. 10, 2022

(65) Prior Publication Data

US 2022/0166537 A1  May 26, 2022

Related U.S. Application Data

(63) Continuation of application No. 16/599,990, filed on Oct. 11, 2019, now Pat. No. 11,258,534.

(51) Int. Cl.
*H04W 24/00* (2009.01)
*H04L 1/00* (2006.01)
(Continued)

(52) U.S. Cl.
CPC ......... *H04L 1/0017* (2013.01); *H04B 17/309* (2015.01); *H04L 1/0003* (2013.01); *H04L 43/08* (2013.01); *H04W 80/02* (2013.01)

(58) Field of Classification Search
CPC ..... H04L 1/0017; H04L 1/0003; H04L 43/08; H04L 1/0015; H04L 1/16; H04L 1/20; H04L 1/0001; H04B 17/309; H04W 80/02

(Continued)

(56) References Cited

U.S. PATENT DOCUMENTS

| 7,499,515 | B1   | 3/2009 | Beadle |
| 11,258,534 | B2 * | 2/2022 | Maallem ............... H04L 1/0001 |

(Continued)

FOREIGN PATENT DOCUMENTS

EP   1303937   12/2009

OTHER PUBLICATIONS

The PCT Search Report and Written Opinion dated Mar. 31, 2021 for PCT Application No. PCT/US20/55274, 18 pages.
(Continued)

*Primary Examiner* — Maharishi V Khirodhar
(74) *Attorney, Agent, or Firm* — Lee & Hayes, P.C.

(57) ABSTRACT

Techniques are directed to using communication metric data associated with multiple modulation schemes to achieve a link quality metric that is representative of the link as a whole, across the multiple modulation schemes that may be employed on the link. A calculation of a link quality metric may be triggered by a network layer transmission attempt, with communication metrics accumulated at the link layer of the link. A filter used to calculate the link quality metric may be updated based on network layer transmission attempts, based on successful and/or unsuccessful transmissions at a Media Access Control (MAC) layer of the link. More generally, a calculation of link quality may be triggered by a higher layer transmission attempt while being calculated based on transmission attempts at a lower layer of the link.

20 Claims, 6 Drawing Sheets

(51) Int. Cl.
  *H04B 17/309* (2015.01)
  *H04W 80/02* (2009.01)
  *H04L 43/08* (2022.01)
(58) Field of Classification Search
  USPC .......................................................... 370/252
  See application file for complete search history.

(56) References Cited

U.S. PATENT DOCUMENTS

| | | | |
|---|---|---|---|
| 2005/0064890 | A1 | 3/2005 | Johan et al. |
| 2005/0118959 | A1 | 6/2005 | Johan et al. |
| 2005/0159166 | A1 | 7/2005 | Jonsson et al. |
| 2005/0185632 | A1 | 8/2005 | Draves, Jr. et al. |
| 2010/0238835 | A1 | 9/2010 | Lundgren et al. |
| 2010/0284454 | A1 | 11/2010 | Oteri et al. |
| 2014/0064097 | A1 | 3/2014 | Gadat et al. |
| 2014/0112398 | A1 | 4/2014 | Kamalizad et al. |
| 2019/0349789 | A1 | 11/2019 | Zeng et al. |
| 2021/0044152 | A1 | 2/2021 | Park et al. |
| 2021/0075691 | A1 | 3/2021 | Zeng et al. |
| 2021/0111828 | A1 | 4/2021 | Bartier et al. |
| 2021/0111832 | A1 | 4/2021 | Maallem et al. |
| 2022/0006559 | A1 | 1/2022 | Bartier et al. |

OTHER PUBLICATIONS

Can et al., "Quality-Aware Routing Metrics for Time-Varying Wireless Mesh Networks," IEEE Journal on Selected Areas in Communications, vol. 24, No. 11, Nov. 2006, pp. 1984-1994.

Elsts, "Source-Node Selection to Increase the Reliability of Sensor Networks for Building Automation," Conference paper, Feb. 2016, 13 pages.

Guo et al., "A Novel Cross-Layer Routing Algorithm in Wireless Mesh Network," 2007, 5 pages.

Guo et al., "UAV-Aided Cross-Layer Routing for MANETS," 2012 IEEE Wireless Communications and Networking Conference: Mobile and Wireless Networks, Apr. 2012, pp. 2928-2933.

Hamida et al., "Short-term Link Quality Estimation for Opportunistic and Mobility Aware Routing in Wearable Body Sensors Networks," 2014 IEEE 10th International Conference on Wireless and Mobile Computing, Network and Communications, Oct. 8, 2014, pp. 519-526.

Invitation to Pay Fees dated Feb. 10, 2021 for Application No. PCT/US20/55274, "Reliable Link Quality Estimation in Multi-Rate Networks," 12 pages.

Kim et al., "On Accurate Measurement of Link Quality in Multi-hop Wireless Mesh Networks," Real-Time Computing Laboratory, Department of Electrical Engineering and Computer Science, 2006, pp. 38-49.

Office Action for U.S. Appl. No. 16/600,029, dated Feb. 18, 2021, Bartier, "Reliable Link Quality Estimation in Multi-Rate Networks," 13 pages.

Office Action for U.S. Appl. No. 16/599,990, dated Apr. 5, 2021, Maallem, "Reliable Link Quality Estimation in Multi-Rate Networks," 13 pages.

Office Action for U.S. Appl. No. 16/599,990, dated Jul. 23, 2021, Maallem, "Reliable Link Quality Estimation in Multi-Rate Networks," 19 pages.

Vera-Perez et al., "Path Quality Estimator for Wireless Sensor Networks Fast Deployment Tool," IEEE, Nov. 21, 2017, pp. 1-4.

Xie et al., "Towards TCP Optimization in Wireless Networks by a Frame based Cross Layer Routing Metric," Globecom 2013—Wireless Networking Symposium, 2013, pp. 4603-4608.

Office Action for U.S. Appl. No. 17/476,170, dated Jan. 23, 2023, Bartier, "Reliable Link Quality Estimation in Multi-Rate Networks ", 32 Pages.

The Canadian Office Action dated Mar. 29, 2023 for Canadian patent application No. 3,155,428, a foreign unterpart of U.S. Pat. No. 11,258,534, 4 pages.

The Singapore Office Action dated Apr. 25, 2023 for Singapore patent application No. 10202251072T, a foreign counterpart of U.S. Pat. No. 11,258,534, 9 pages.

European Office Action dated Oct. 25, 2023 for European Patent Application No. 20800478.8, a foreign counterpart to U.S. Pat. No. 11,258,534.

\* cited by examiner

RELIABLE LINK QUALITY ESTIMATION IN MULTI-RATE NETWORKS

RELATED APPLICATION

This application is a continuation of and claims priority to U.S. patent application Ser. No. 16/599,990, filed on Oct. 11, 2019, which is incorporated by reference herein.

BACKGROUND

Communication networks, such as wireless mesh networks, star networks, and so on, are used to connect a variety of different devices. These communication networks often contain devices having different characteristics and capabilities. As such, in many instances, the devices can communicate according to multiple modulation schemes. Furthermore, a device may select a link for communication based on link quality metrics for the available links associated with modulation schemes that are available. The metrics may, for example, indicate a success of previous communications on the various links using those modulation schemes. However, when link selection is focused on link quality metrics developed for only one modulation scheme, the link selection may not be optimal. For example, focusing on link quality metrics for only one modulation scheme can lead to instability of the network due the large variations in the link quality when the modulation schemes being used are different from those used to evaluate the links.

Furthermore, metrics accumulated at just one layer of communication (e.g., network layer or Media Access Control, or MAC, layer) may not provide the basis of a precise link quality metric that accurately represents the quality of a link. On the other hand, a link quality metric determined based on such metrics may be too precise, resulting in a link quality metric that is excessively volatile.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
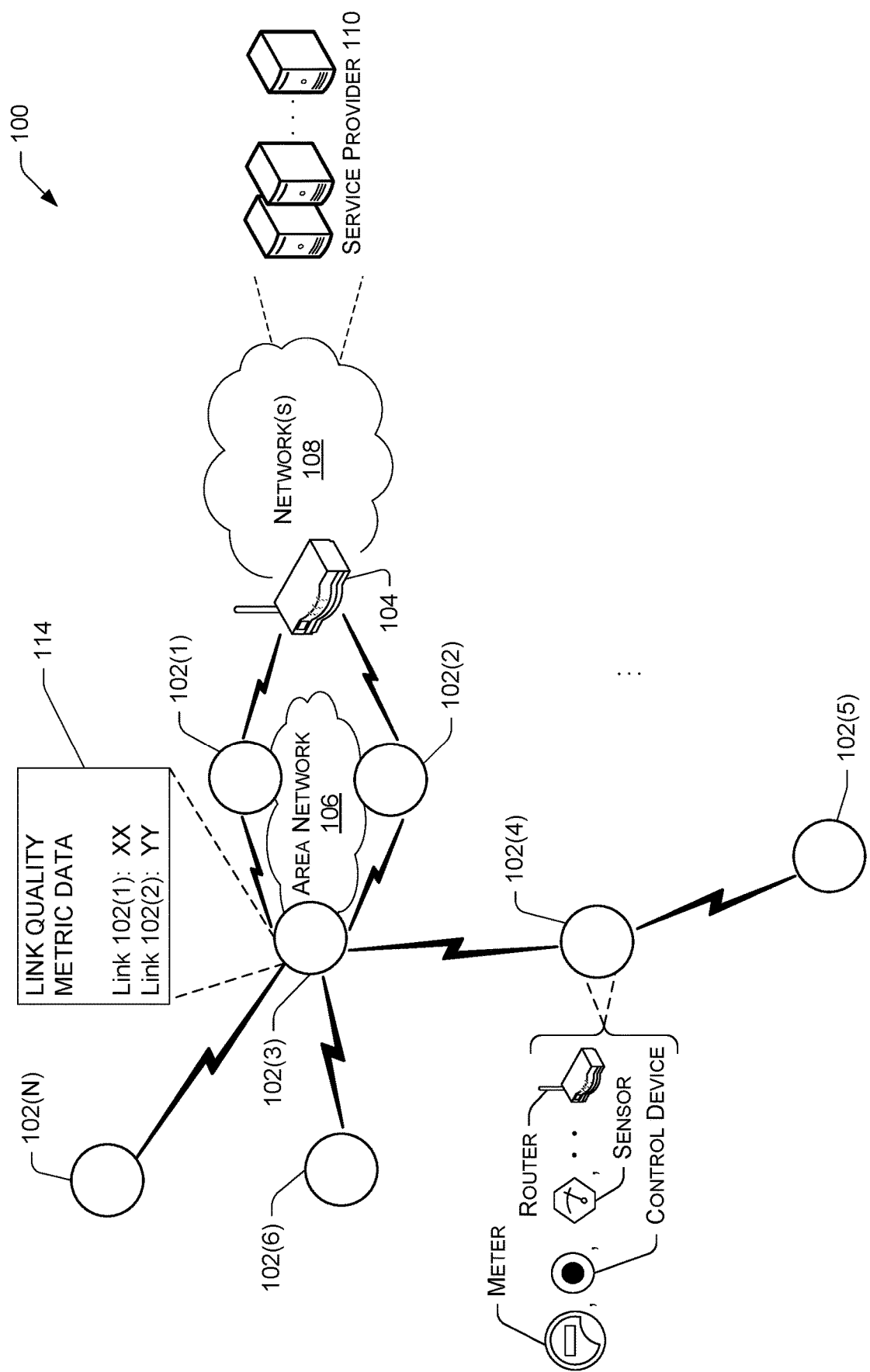
FIG. 1 is a schematic diagram of an example network architecture.

As discussed above, metrics about different communication links may be evaluated to select an appropriate communication link. However, in many instances link quality metrics for the various communication links are developed for only one modulation scheme (modulation type and/or data rate). This may lead to a network instability due to the large variations in the link quality when the modulation schemes actually being used are different from those used to evaluate the links.

This disclosure describes techniques directed to attributing to link quality information regarding communications with a plurality of modulation schemes. In one example, successful communications on a link using a first modulation scheme and a second modulation scheme may contribute to an overall link quality metric for the link. Such contributions to the overall link quality metric for the link may be weighted for the respective modulation schemes. In another example, unsuccessful communications on a link using a first modulation scheme and a second modulation scheme may contribute to an overall link quality metric for the link. Such contributions to the overall link quality metric for the link may be weighted for the respective modulation schemes. As such, the techniques may generate link quality metric data for a link that considers more than one modulation scheme that may be utilized on the link. This may ultimately result in link quality metric data for a link that is more useful across multiple modulation schemes.

In one illustration, a device may communicate over a link that has been chosen according to link quality metric data associated with a plurality of links available to the device for communication. The link may be a direct communication path between the device and another device and communication over the link may be possible using one of a plurality of modulation schemes. The device may store, for example, information regarding a number of transmission attempts to the other device with each modulation scheme, a number of transmissions acknowledged by the other device with each modulation scheme, and so on. Such information may generally represent communication metric data regarding successful and/or unsuccessful transmissions on the link between the two devices with each modulation scheme. The metric data associated with each modulation scheme may be combined to achieve a link quality metric that is representative of the link, across multiple modulation schemes that may be employed on the link.

Alternately or in addition, a calculation of link quality metric may be triggered by network layer transmission attempts, based on communication metrics accumulated at the link layer of the link. For example, a filter used to calculate the link quality metric may be updated based on network layer transmission attempts, based on successful and/or unsuccessful transmissions at the MAC layer of the link. More generally, a calculation of link quality may be triggered by a higher layer transmission attempt while being calculated based on transmission attempts at a lower layer of the link.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein applicable to any communications network, control network, and/or another type of network or system. In one example, the techniques may be implemented in the context of the Internet of Things (IoT).

Example Environment

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108. Any of the network communication devices 102, the network communication device 104, and/or the service provider 110 may perform processing to attribute information regarding communications with a first modulation scheme to a second modulation scheme.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the AN 106 may comprise a star network, in which a central device acts a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may communicate according to various modulation schemes that are available to it and perform processing to determine and indicate a preferred link to use for communication. Available modulation schemes may differ by modulation type and/or by data rate.

For instance, the network communication device 102(3) may transmit and/or receive one or more communications/transmissions (e.g., Protocol Data Units (PDUs), such as bits, frames, packets, segments, etc.) with the network communication device 102(1) and/or 102(2) and, based on the communications, determine a preferred link to use. The network communication device 102(3) may maintain, at 114, link quality metric data for available links to other communication devices. Further, the network communication device 102(3) may update the link quality metrics at 114 and, based thereon, determine (or not) that a new link is to be the preferred link. In some examples, the link quality metrics at 114 may be based on communication metrics associated with multiple modulation schemes and/or the calculation of a link quality metric may be triggered by an attempted communication at a higher communication layer of the link while being calculated based on communication metric data gathered based on communication at a lower layer of the link.

Communication metric data may include a detected/measured value, a computed value, or any other statistic, metric, or value related to communication. For example, communication metric data may indicate a number of transmission attempts (e.g., a number of transmissions sent), a number of successful transmissions (e.g., a number of transmissions that are acknowledged by a receiving node), a number of unsuccessful transmissions (e.g., calculated by subtracting a number of transmission attempts by a number of acknowledgements), and so on. Further, in some examples communication metric data includes an Expected Transmission (ETX) metric and/or an Expected Transmission Time (ETT) metric, as discussed in further detail below.

In many instances, communication metric data may include data that is specific to a particular modulation scheme and/or to a particular link (e.g., direct communication path between devices). To illustrate, communication metric data may indicate a number of successful transmissions and a number of transmission attempts via a particular link (between a first node and a second node) with a particular modulation scheme.

An ETX metric may generally indicate an expected number of transmissions required to successfully send a transmission to a device. The ETX metric may be computed in a variety of manners. In one example, an ETX metric equals a total number of transmissions sent (e.g., transmission attempts) over a number of successful transmissions (e.g., transmissions acknowledged). In another example, an ETX metric equals 1/P, where P=Pf×Pr. Here, Pf corresponds to a probably that a transmission successfully arrives at a recipient, and Pr corresponds to a probability that an acknowledgment transmission is successfully received by a sender. Pf and Pr may be calculated according to the following formulas:

$$Pf = \frac{\text{Number of transmissions (e.g., probes)}}{\text{Number of transmissions (e.g., probes)}} \frac{\text{received by a neighbor (e.g., recipient)}}{\text{sent by a sender}}$$

$$Pr = \frac{\text{Number of transmissions (e.g., probes)}}{\text{Number of transmissions (e.g., probes)}} \frac{\text{received by a sender}}{\text{sent by a neighbor (e.g., recipient)}}$$

In some instances, such as where Pf and Pr cannot be computed separately (e.g., when the sender does not know the number of transmissions that a receiver sent to it), then the ETX metric may be estimated as in the first example above. That is, if Pf and Pr cannot be computing separately due to a lack of information, the ETX metric may correspond to a total number of transmissions sent over a number of successful transmissions.

An ETT metric may generally indicate an expected time required to successfully send a transmission to a device. In one example, the ETT metric equals a time to transmit a transmission of a given size multiplied to the ETX metric.

Communication metric data may be used in a variety of manners. In some instances, communication metric data is used to select a modulation scheme for communicating. For example, a network communication device may select a modulation scheme to use for communicating on a particular link based on ETX metrics for multiple modulation schemes that are available for the link. In particular, if a first modulation scheme that is supported by two network communication devices is associated with a lower ETX metric than a second modulation scheme that is also supported by the two network communication devices, the first modulation scheme may be selected.

Example Network Communication Device

Figure 2:
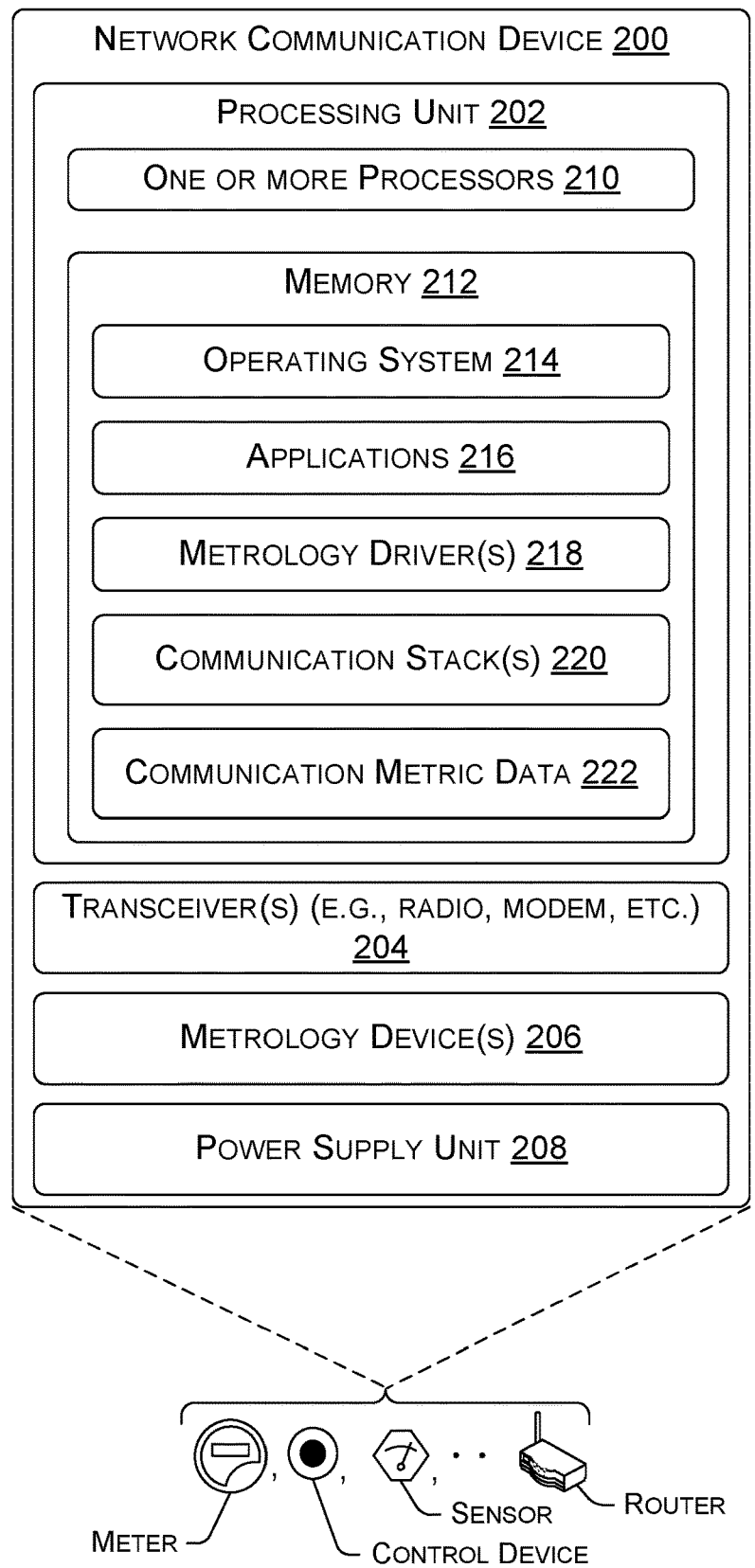
FIG. 2 is a diagram showing details of an example network communication device.

FIG. 2 is a diagram showing details of an example network communication device 200, such as any of the network communication devices 102 or the network communication device 104. The network communication device 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 comprises a Full Function Device (FFD), while in other instances the network communication device 200 comprises a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 comprises physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as a FFD, the power supply unit 208 comprises a mains power connector that couples to an Alternating Current (AC) or Direct Current (DC) mains power line where the network communication device 200 is installed. In other instances, such as when the network communication device 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 includes an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also store communication metric data 222. Communication metric data 222 may be updated from time to time to maintain data for multiple modulation schemes and/or multiple communication links.

In some instances, the network communication device 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The network communication device 200 may be configured to implement a variety of modulation schemes. A modulation scheme may be associated with a modulation type, a data rate, and/or other parameters. In some instances, a same modulation type is used for different modulations schemes to produce different data rates.

Example modulation schemes include: Direct-Sequence Spread Spectrum (DSSS), Quadrature Phase-Shift Keying (QPSK) (e.g., "LONG_RANGE" scheme) associated with a data rate of 12.5 kbps; Frequency Shift Keying (FSK) (e.g., "4G_FSK_150" scheme) associated with a data rate of 75 kbps; Orthogonal Frequency-Division Multiplexing (OFDM) (e.g., "4G_OFDM_200" scheme) associated with a data rate of 200 kbps; OFDM (e.g., "4G_OFDM_600" scheme) associated with a data rate of 600 kbps; Differential 8 PSK (D8PSK) associated with a data rate of around 200 kbps; Differential Quadrature PSK (DQPSK) associated with a data rate of around 165 kbps; Differential Binary PSK (DBPSK) associated with a data rate of around 105 kbps; Robust OFDM (ROBO); or any other modulation scheme. DSSS QPSK (e.g., "LONG_RANGE" scheme), FSK (e.g., "4G_FSK_150" scheme), OFDM (e.g., "4G_OFDM_200" scheme), and OFDM (e.g., "4G_OFDM_600" scheme) may correspond to RF modulation schemes. Meanwhile, D8PSK, DQPSK, DBPSK, and ROBO may correspond to PLC modulation schemes. Although any other modulation schemes may be used.

In many instances, the above noted modulation schemes may be ordered according to data rates as follows:

(i) For RF: 4G_OFDM_600>4G_OFDM_200>4G_FSK_150>LONG RANGE;

(ii) For PLC: D8PSK>DQPSK>DBPSK>ROBO

The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random access memory (RAM) and/or non-volatile memory, such as read only memory (ROM) or flash RAM. Computer-readable media devices include volatile and nonvolatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Example Processes

FIG. 3, FIG. 4, FIG. 5 and FIG. 6 illustrate example processes 300, 400, 500 and 600 for employing the techniques discussed herein. For ease of illustration the processes 300, 400, 500 and 600 may be described as being performed by a device described herein, such as the network communication device 200 and/or the service provider 110. However, the processes 300, 400, 500 and 600 may be performed by other devices. Moreover, the devices may be used to perform other processes.

The processes 300, 400, 500 and 600 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Figure 3:
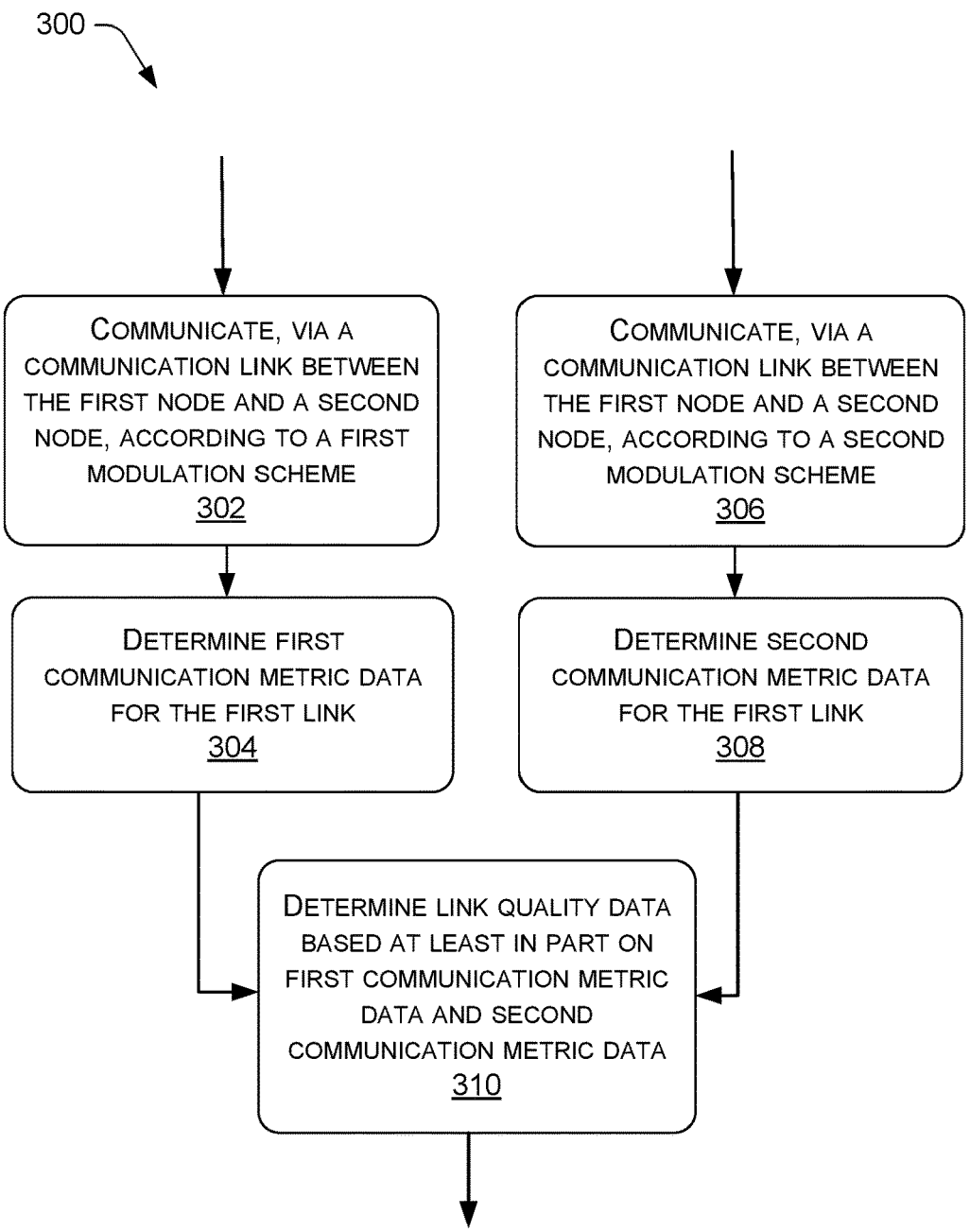
FIG. 3 illustrates an example process to develop an overall link quality metric for a link using communication over the link according to two or more different modulation schemes.

FIG. 3 illustrates an example process 300 to develop an overall link quality metric for a link using communication over the link according to two or more different modulation schemes. The modulation schemes may differ from each other, for example, at least by modulation type, by data rate, or both.

The network communication device 200 may initiate a link evaluation in a variety of manners. In one example, the network communication device 200 performs an "Active Link Evaluation." Here, the network communication device 200 determines that a predetermined period of time has passed since a previous update to communication metric data. This determination may trigger one or more transmissions to be sent by the network communication device 200 to another network communication device, such one or more probe transmissions. If successful, these transmissions are acknowledged by the other network communication device (e.g., the network communication device 200 receives an acknowledgement(s) of the transmissions from the other network communication device). After sending the one or more transmissions (and/or receiving acknowledgements), the communication device 200 may use information it has gathered regarding successful and failed communications to evaluate a link. As such, in the Active Link Evaluation, a link may be evaluated periodically based on actively sending transmissions.

In another example, the network communication device 200 performs a "Passive Link Evaluation." Here, the network communication device 200 maintains normal operations by sending transmissions as they normally occur according to a communication schedule. After determining that a period of time has passed, the network communication device 200 may determine if there have been a predetermined number of transmissions on a link to trigger an evaluation of the link. When the network communication device 200 determines that the predetermined number of transmissions have occurred, the network communication device 200 may proceed to evaluate a link.

In either example, the network communication device 200 may have communicated with another network communication device (e.g., node) one or more times using two or more modulation schemes. As part of evaluating the link, it is determined what modulation scheme is preferred for communication over the link. An indication of the preferred modulation scheme is saved, such as, for example, by storing the indication as part of the communication metric data 222 in the memory 212 of the network communication device 200.

Turning now specifically to the example process 300 illustrated in FIG. 3, at 302, the network communication device 200 communicates with another communication over a link, according to a first modulation scheme. At 304, the network communication device 200 determines first communication metric data for the link, relative to the communication according to the first modulation scheme. Meanwhile, at 306, the network communication device communicates over the link according to the second modulation scheme. The communication according to the second modulation scheme, at 306, may be intertwined with or sequential to the communication according to the first modulation scheme. At 308, the network communication device 200 determines second communication metric data for the link, relative to the communication according to the second modulation scheme. At 310, the network communication device determines link quality data for the link based at least in part on the first communication metric data and the second communication metric data. While the FIG. 3 example process illustrates determining link quality data based on communication according to two modulation schemes, in other examples, communication according to three or more modulation schemes may be used to determine the link quality data.

Figure 4:
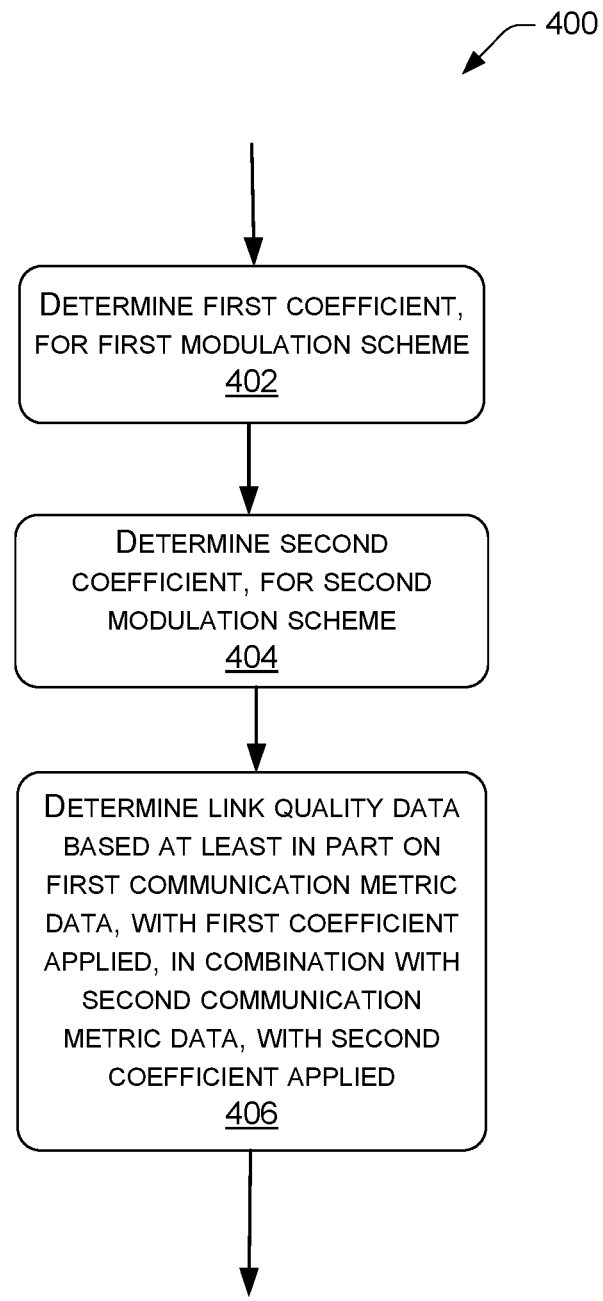
FIG. 4 illustrates an example process to determine link quality data in the FIG. 3 example process.

Turning now to FIG. 4, the process 400 is one example of how the operation 310 may be carried out. At 402, a first coefficient is determined, for the first modulation scheme. At 404, the second coefficient is determined, for the second modulation scheme. For example, the determination of coefficient may take into account the number of transmission attempts according to the modulation scheme and an "operating mode factor" that is heuristically determined based on the modulation scheme. At 406, the link quality data is determined based at least on applying the first coefficient to the first communication metric data and applying the second coefficient to the second communication metric data. In one example, at 406, the following equation may be utilized, to determine an overall ETX link quality value:

$$ETX_{link} = \frac{\sum_1^N OperatingModeFactor_n * PDU\_TxAttempts_n * ETX_n}{\sum_1^N PDU\_TxAttempts_n}$$

N is the number of modulation schemes utilized, and the product of OperatingModeFactor for a modulation scheme and the number of transmission attempts according to that modulation scheme are the coefficient for that modulation scheme. In one example, the OperatingModeFactor portion of the coefficient is as shown in the following table:

| Operating Mode (N) | Operating_Mode_Factor |
|---|---|
| OFDM 1200 | 128 |
| OFDM 600 | 144 |
| FSK 150 | 192 |

Figure 5:
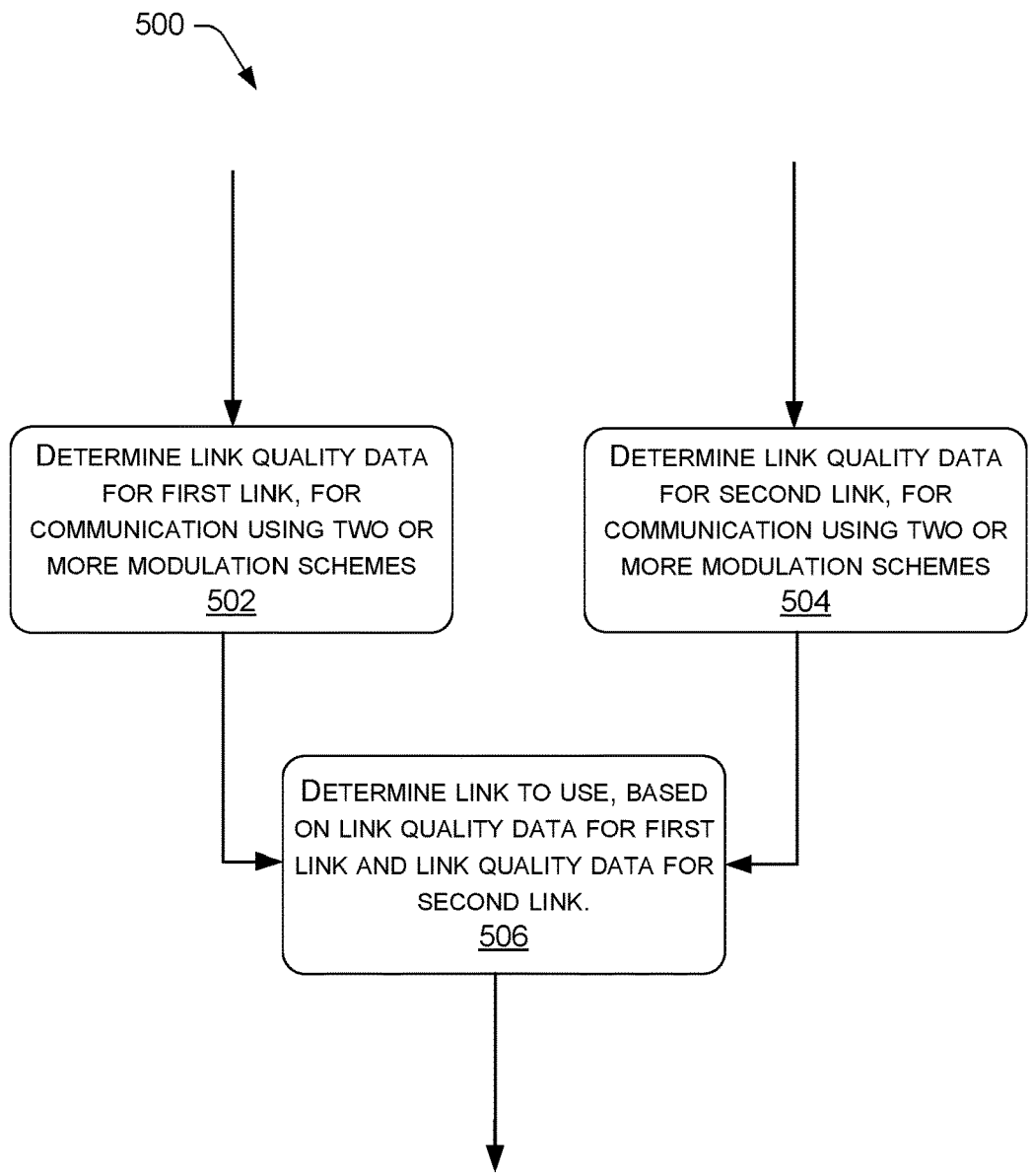
FIG. 5 illustrates an example process to determine a link to use, with link quality data determined with communication according to two or more modulation schemes.

FIG. 5 illustrates an example process 500 for the communication node 200 to determine a link to use, with link quality data determined with communication according to two or more modulation schemes. At 502, link quality data is determined for a first link, for communication according to two or more modulation schemes. This may be accomplished, for example, using the FIG. 4 example process. At 504, link quality data is determined for a second link, for communication according to two or more modulation schemes. Again, this may be accomplished, for example, using the FIG. 4 example process. Furthermore, the two or more modulation schemes utilized at 504 may be the same as those used at 502, or only some may be the same, or none may be the same. At 506, based on the link quality data determined at 502 and 504, the communication node 200 determines the link to use.

In accordance with another aspect, determination of communication metric data for a link may be triggered and updated at a higher layer of network communication, such as by initiation of a PDU transmission at the network layer, while the link quality metrics (such as number of attempted transmissions and number of successful transmissions) are determined based on communication at a lower layer of network communication, such as at the MAC layer. For example, as described in detail below, a filter used to calculate the link quality metric may be triggered and updated as a result of network layer transmission attempts, based on successful and/or unsuccessful transmissions at the MAC layer of the link.

For each modulation scheme according to which there is communication on the link, the ETX may be calculated as follows:

$$ETX_n = \frac{PDU\_TxAttempts_n}{AcksReceived_n}$$

The ETX calculations may be performed at a defined epoch, with the results being provided to a filtering calculation, such as an exponentially weighted moving average (EWMA) calculation.

In one example, the defined epoch at which the ETX calculations are performed is when the total number of network layer PDU transmission attempts since the last ETX calculation is at least four (over all modulation schemes). Furthermore, the FrameTxAttempts and AcksReceived counts are attempts and acknowledgements, respectively, at the MAC layer of communication on the link. In one example, the ETX calculation is performed for each modulation scheme that has at least four network layer attempts.

In one example, the EWMA calculation for each modulation scheme is defined as follows, given a sequence of values X(t=0, 1, 2, 3, . . . ):

$$EWMA(t) = S(X(t)) + (1 - S)(EWMA(t-1))$$

where S is a smoothing factor between 0 and 1, and EWMA(0)=X(0). The smoothing factor for each $ETX_n$ may be determined by the following algorithm:

if $((PDU\_TxAttempts_n \le 4)$ smoothing $factor_n = \frac{PDU\_TxAttempts_n}{32}$ else smoothing $factor_n = \frac{1}{8}$.

From an implementation standpoint, then, the following variables may be maintained.

| | |
|---|---|
| $PDU\_TxAttempts_n$ | Initialized to zero, and accumulates PDU transmission attempts. It is reset to zero after the overall ETX calculation for the link. |
| $AcksReceived_n$ | Initialized to zero, and accumulates the number of ACKs. It is reset to zero after the overall ETX calculation. |
| $ETX_n$ | A temporary variable used to store calculations results. It is initialized to zero. It is reset to zero after each calculation is fed into the EWMA. |
| $ETXN_{n\_EWMA}$ | Used to store the EWMA value of the ETX for one modulation scheme. It is initialized with the first calculation (used as is, without the smoothing factor). It is never reset. |

The link layer also may maintain a variable for the overall local ETX value with a neighbor, that is used by the network layer to determine which link to utilize, such as by executing a Minimum Rank with Hysteresis Objective Function (MRHOF). See RFC 6719, dated September 2012. While the implementation has been discussed in terms of an ETX value, other types of link quality metrics may be utilized.

Figure 6:
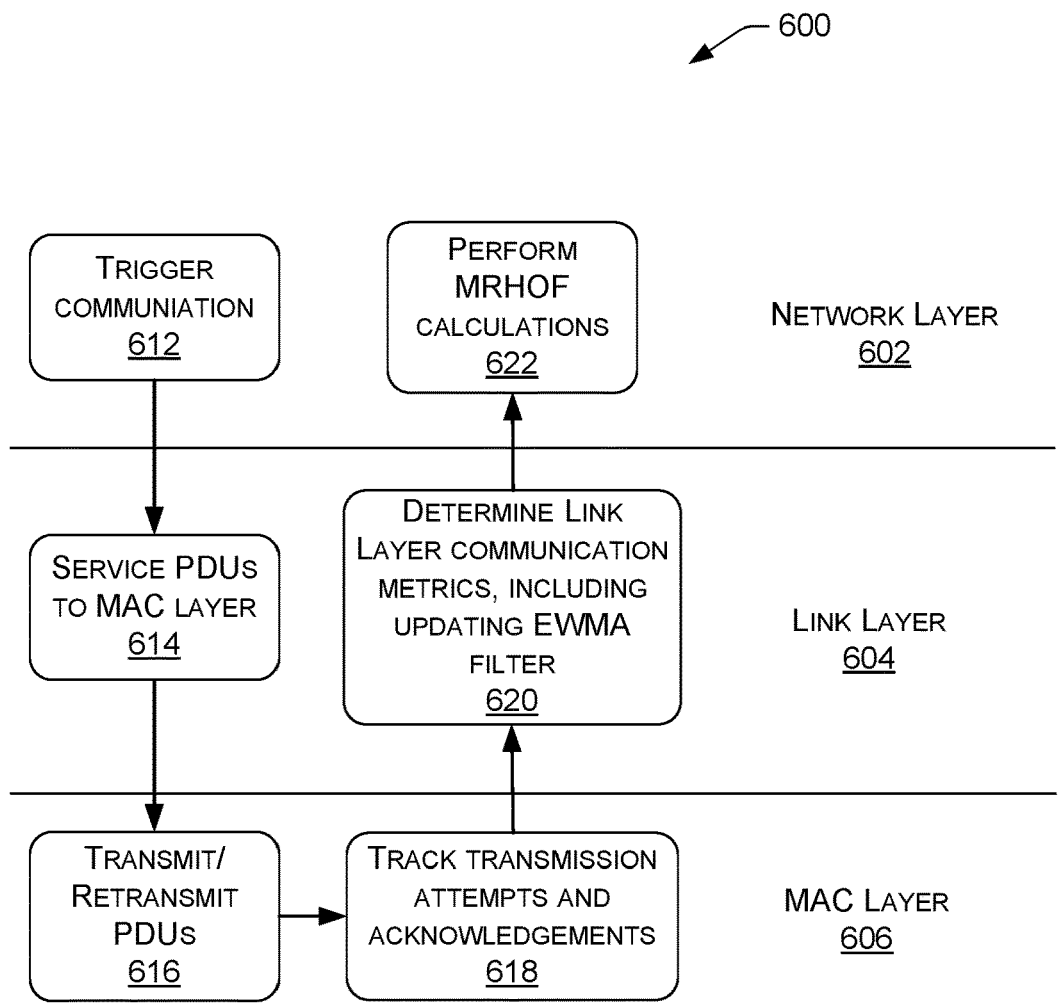
FIG. 6 illustrates an example process in which determination of communication metric data for a link triggered and updated at a network layer, while the link quality metrics are determined at a link layer based on communication at a MAC layer.

FIG. 6 illustrates an example process 600 in which determination of communication metric data for a link triggered and updated at a network layer 602, by initiation of a PDU transmission at the network layer 602, while the link quality metrics (such as number of attempted transmissions and number of successful transmissions) are determined at a link layer 604 based on communication at a MAC layer 604. At 612, a communication is triggered at the network layer 602. At 614, processing at the link layer 604 services PDUs to the MAC layer 606. At 616, PDUs are transmitted (and retransmitted as appropriate), and at 618 transmission attempts and acknowledgements are tracked.

At 620, link layer communication metrics are updated after a designated number of network layer communication triggers (e.g., after four such communication triggers), including updating an EWMA calculation when the link metrics are updated. The EWMA calculation is just one example of a method to maintain and update link layer communication metrics. At 622, MRHOF processing uses the link metrics in routing determination, such as to determine a best link for the communication node to use. The MRHOF process is just one example of a routing determination method.

With the process 600 and, more generally, with a link quality determination process that is triggered by communication activity at a higher network layer based on communication activity at a lower network layer, the network may evolve when looking for better routing alternatives, while still having an acceptable network stability.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
at a first layer of a protocol stack triggering a communication of data, by a first node and via a communication link between the first node and a second node, with the second node:
   determining first link quality data for a first link associated with the communication of the data at a second layer of the protocol stack, wherein the second layer is lower than the first layer;
   determining second link quality data for a second link associated with the communication of the data at the second layer of the protocol stack;
   maintaining the first link quality data and the second link quality data at the first layer of the protocol stack; and
   determining which of the first link and the second link to use based on the first link quality data and the second link quality data,
   wherein the first link quality data and the second link quality data include at least communication metric data for the communication of data at the second layer of the protocol stack for a plurality of different modulation schemes.

2. The method of claim 1, wherein the determining of the first link quality data comprises:
   determining a first coefficient for a first modulation scheme of the plurality of different modulation schemes;
   determining a second coefficient for a second modulation scheme of the plurality of different modulation schemes; and
   determining the first link quality data based at least in part on applying the first coefficient to first communication metric data and applying the second coefficient to second communication metric data.

3. The method of claim 2, wherein the determining of the second link quality data comprises:
   determining a third coefficient for a third modulation scheme of the plurality of different modulation schemes;
   determining a fourth coefficient for a fourth modulation scheme of the plurality of different modulation schemes; and
   determining the second link quality data based at least in part on applying the third coefficient to third communication metric data and applying the fourth coefficient to fourth communication metric data.

4. The method of claim 3, wherein the first communication metric data, the second communication metric data, the third communication metric data, and the fourth communication metric data are determined based on measured metric values.

5. The method of claim 3, wherein the first communication metric data, the second communication metric data, the third communication metric data, and the fourth communication metric data associated with the communication of the data at the second layer of the protocol stack includes at least an indication of transmissions attempted and acknowledgements received.

6. The method of claim 3, wherein the first communication metric data, the second communication metric data, the third communication metric data, and the fourth communication metric data associated with the communication of the data at the second layer of the protocol stack includes at least an expected transmission (ETX) metric.

7. The method of claim 1, wherein the maintaining the first link quality data and the second link quality data at the first layer of the protocol stack utilizes an exponential weighted moving average filter with at least the communication metric data as input.

8. The method of claim 1, wherein the first layer of the protocol stack is a network layer and the second layer is a Media Access Control (MAC) layer.

9. The method of claim 1, further comprising making a routing selection based at least in part on the first link quality data or second link quality data.

10. A network communication device comprising:
a radio configured to communicate with a second network communication device;
one or more processors communicatively coupled to the radio; and
memory communicatively coupled to the one or more processors, the memory storing one or more instructions that, when executed by the one or more processors, cause the one or more processors to perform operations comprising: at a first layer of a protocol stack triggering a communication of data, by a first node and via a communication link between the first node and a second node, with the second node:
- determining first link quality data for a first link associated with the communication of the data at a second layer of the protocol stack, wherein the second layer is lower than the first layer;
- determining second link quality data for a second link associated with the communication of the data at the second layer of the protocol stack;
- maintaining the first link quality data and the second link quality data at the first layer of the protocol stack; and
- determining which of the first link and the second link to use based on the first link quality data and the second link quality data,
- wherein the first link quality data and the second link quality data include at least communication metric data for the communication of data at the second layer of the protocol stack for a plurality of different modulation schemes.

11. The network communication device of claim 10, wherein the determining of the first link quality data comprises:
- determining a first coefficient for a first modulation scheme of the plurality of different modulation schemes;
- determining a second coefficient for a second modulation scheme of the plurality of different modulation schemes; and
- determining the first link quality data based at least in part on applying the first coefficient to first communication metric data and applying the second coefficient to second communication metric data.

12. The network communication device of claim 11, wherein the determining of the second link quality data comprises:
- determining a third coefficient for a third modulation scheme of the plurality of different modulation schemes;
- determining a fourth coefficient for a fourth modulation scheme of the plurality of different modulation schemes; and
- determining the second link quality data based at least in part on applying the third coefficient to third communication metric data and applying the fourth coefficient to fourth communication metric data.

13. The network communication device of claim 12, wherein the first communication metric data, the second communication metric data, the third communication metric data, and the fourth communication metric data are determined based on measured metric values.

14. The network communication device of claim 12, wherein the first communication metric data, the second communication metric data, the third communication metric data, and the fourth communication metric data associated with the communication of the data at the second layer of the protocol stack includes at least an indication of transmissions attempted and acknowledgements received, at least an expected transmission (ETX) metric, or combinations thereof.

15. One or more computer-readable storage media storing computer-readable instructions that, when executed, instruct one or more processors of a network communication device to perform operations comprising:
- at a first layer of a protocol stack triggering a communication of data, by a first node and via a communication link between the first node and a second node, with the second node:
  - determining first link quality data for a first link associated with the communication of the data at a second layer of the protocol stack, wherein the second layer is lower than the first layer;
  - determining second link quality data for a second link associated with the communication of the data at the second layer of the protocol stack;
  - maintaining the first link quality data and the second link quality data at the first layer of the protocol stack; and
  - determining which of the first link and the second link to use based on the first link quality data and the second link quality data,
  - wherein the first link quality data and the second link quality data include at least communication metric data for the communication of data at the second layer of the protocol stack for a plurality of different modulation schemes.

16. The one or more computer-readable storage media of claim 15, wherein the determining of the first link quality data comprises:
- determining a first coefficient for a first modulation scheme of the plurality of different modulation schemes;
- determining a second coefficient for a second modulation scheme of the plurality of different modulation schemes; and
- determining the first link quality data based at least in part on applying the first coefficient to first communication metric data and applying the second coefficient to second communication metric data.

17. The one or more computer-readable storage media of claim 16, wherein the determining of the second link quality data comprises:
- determining a third coefficient for a third modulation scheme of the plurality of different modulation schemes;
- determining a fourth coefficient for a fourth modulation scheme of the plurality of different modulation schemes; and
- determining the second link quality data based at least in part on applying the third coefficient to third communication metric data and applying the fourth coefficient to fourth communication metric data.

18. The one or more computer-readable storage media of claim 17, wherein the first communication metric data, the second communication metric data, the third communication metric data, and the fourth communication metric data are determined based on measured metric values.

19. The one or more computer-readable storage media of claim 17, wherein the first communication metric data, the second communication metric data, the third communication metric data, and the fourth communication metric data associated with the communication of the data at the second layer of the protocol stack includes at least an indication of transmissions attempted and acknowledgements received.

20. The one or more computer-readable storage media of claim 17, wherein the first communication metric data, the second communication metric data, the third communication metric data, and the fourth communication metric data associated with the communication of the data at the second layer of the protocol stack includes at least an expected transmission (ETX) metric.

\* \* \* \* \*